(12) United States Patent
Sato

(10) Patent No.: US 11,396,294 B2
(45) Date of Patent: Jul. 26, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 269 days.

(21) Appl. No.: 16/597,540

(22) Filed: Oct. 9, 2019

(65) Prior Publication Data

US 2020/0207348 A1 Jul. 2, 2020

(30) Foreign Application Priority Data

Dec. 28, 2018 (JP) .............................. JP2018-248429

(51) Int. Cl.
*B60W 30/165* (2020.01)
*B60W 30/16* (2020.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC combination set(s) only.
See application file for complete search history.

(56) References Cited

U.S. PATENT DOCUMENTS 8,700,299 B2 4/2014 Morita et al.
9,308,914 B1 4/2016 Sun et al.
(Continued)

FOREIGN PATENT DOCUMENTS

DE 102016009709 A1 * 2/2017
JP 2009-149255 7/2009
(Continued)

OTHER PUBLICATIONS

Machine Translation of WO2009086857 (Year: 2009).*
(Continued)

*Primary Examiner* — Adam R Mott
*Assistant Examiner* — Achaiah Ruben Abul
(74) *Attorney, Agent, or Firm* — Cozen O'Connor

(57) ABSTRACT

In a driving control apparatus for a vehicle having an ACC function for performing constant speed cruise according to a target speed when there is no preceding other vehicle in a vehicle's driving lane and performing following cruise by maintaining a predetermined inter-vehicle distance when there is a preceding other vehicle, an LKA function for maintaining cruise in the vehicle's driving lane by following control to a target path, an override function for stopping the ACC function and the LKA function by a driver's operation intervention, and a function for notifying the driver of stopping the LKA function and the ACC function and operation takeover and performing fallback control of the LKA function and the ACC function at the time of system limit of the LKA function, override threshold values serving as a determination criterion of the operation intervention for stopping the LKA function and the ACC function at the time of system limit of the LKA function are configured to be altered to a value greater than during normal operation when the LKA function is within the system limit.

6 Claims, 7 Drawing Sheets

(51) Int. Cl.
  *B60W 10/04* (2006.01)
  *B60W 10/20* (2006.01)
  *B60W 10/18* (2012.01)

(52) U.S. Cl.
  CPC .......... *B60W 10/20* (2013.01); *B60W 30/162* (2013.01); *B60W 2554/801* (2020.02); *B60W 2710/18* (2013.01); *B60W 2710/20* (2013.01); *B60W 2720/106* (2013.01)

(56) References Cited

U.S. PATENT DOCUMENTS

| | | | |
|---|---|---|---|
| 9,775,004 | B2 | 9/2017 | Cawse et al. |
| 10,001,781 | B2 | 6/2018 | Nakamura et al. |
| 10,365,115 | B2 | 7/2019 | Nair et al. |
| 10,589,786 | B2 | 3/2020 | Fujii |
| 10,704,301 | B2 | 7/2020 | Kim et al. |
| 10,839,689 | B2 | 11/2020 | Mizoguchi |
| 2005/0015203 | A1 | 1/2005 | Nishira |
| 2005/0104745 | A1 | 5/2005 | Bachelder et al. |
| 2005/0187701 | A1 | 8/2005 | Baney |
| 2005/0216172 | A1 | 9/2005 | Schroder |
| 2009/0167561 | A1 | 7/2009 | Liang |
| 2009/0287401 | A1 | 11/2009 | Levine et al. |
| 2010/0030458 | A1 | 2/2010 | Coughlin |
| 2010/0082190 | A1 | 4/2010 | Jinno et al. |
| 2010/0161192 | A1 | 6/2010 | Nara et al. |
| 2010/0171640 | A1 | 7/2010 | Delia et al. |
| 2010/0308986 | A1 | 12/2010 | Dobryden et al. |
| 2011/0043348 | A1 | 2/2011 | Blackard et al. |
| 2011/0126797 | A1 | 6/2011 | Russell |
| 2011/0241862 | A1 | 10/2011 | Debouk et al. |
| 2014/0156182 | A1 | 6/2014 | Nemec et al. |
| 2014/0336913 | A1 | 11/2014 | Fino |
| 2015/0145995 | A1 | 5/2015 | Shahraray et al. |
| 2015/0154860 | A1 | 6/2015 | Holzwanger et al. |
| 2015/0166062 | A1 | 6/2015 | Johnson et al. |
| 2016/0148507 | A1 | 5/2016 | Pittman et al. |
| 2016/0207537 | A1 | 7/2016 | Urano |
| 2016/0358463 | A1 | 12/2016 | Cho et al. |
| 2017/0018189 | A1 | 1/2017 | Ishikawa |
| 2017/0029021 | A1 | 2/2017 | Lee et al. |
| 2017/0124868 | A1 | 5/2017 | Bhat et al. |
| 2017/0154525 | A1 | 6/2017 | Zou et al. |
| 2017/0225686 | A1 | 8/2017 | Takaso et al. |
| 2017/0341647 | A1 | 11/2017 | Rajvanshi et al. |
| 2017/0355368 | A1 | 12/2017 | O'Dea |
| 2018/0075739 | A1 | 3/2018 | Ginsberg et al. |
| 2018/0151064 | A1 | 5/2018 | Xu et al. |
| 2018/0157258 | A1 | 6/2018 | O'Brien et al. |
| 2018/0173228 | A1 | 6/2018 | Wada et al. |
| 2018/0253968 | A1 | 9/2018 | Yalla |
| 2018/0261083 | A1 | 9/2018 | Sun |
| 2018/0354518 | A1 | 12/2018 | Inou et al. |
| 2019/0071099 | A1 | 3/2019 | Nishiguchi |
| 2019/0082377 | A1 | 3/2019 | Silver |
| 2019/0084572 | A1 | 3/2019 | Oishi et al. |
| 2019/0106108 | A1 | 4/2019 | Wienecke et al. |
| 2019/0122178 | A1 | 4/2019 | Kempf |
| 2019/0122548 | A1 | 4/2019 | Sakuma |
| 2019/0180617 | A1 | 6/2019 | Hori et al. |
| 2019/0243371 | A1 | 8/2019 | Nister et al. |
| 2019/0272747 | A1 | 9/2019 | Raamot |
| 2019/0300014 | A1 | 10/2019 | Nagase et al. |
| 2019/0322289 | A1 | 10/2019 | Adachi et al. |
| 2020/0070827 | A1 | 3/2020 | Choi |
| 2020/0079377 | A1 | 3/2020 | Yashiro et al. |
| 2020/0184238 | A1 | 6/2020 | Kobayashi et al. |
| 2020/0201356 | A1 | 6/2020 | Schuh et al. |
| 2020/0207348 | A1 | 7/2020 | Sato |
| 2020/0255007 | A1 | 8/2020 | Tsuji et al. |
| 2020/0307582 | A1 | 10/2020 | Sato |
| 2021/0061275 | A1 | 3/2021 | Takahama |
| 2021/0370914 | A1 | 12/2021 | Li et al. |

FOREIGN PATENT DOCUMENTS

| | | |
|---|---|---|
| JP | 2012 096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2019-051894 | 4/2019 |
| JP | 2019-127136 | 8/2019 |
| WO | WO2009086857 A1 * | 7/2009 |

OTHER PUBLICATIONS

Machine Translation of DE102016009709A1 (Year: 2016).*
Notice of Allowance dated Aug. 10, 2021 issued in U.S. Appl. No. 16/791,729.
Office Action dated Jun. 29, 2021 issued in U.S. Appl. No. 16/783,912.
Office Action dated Aug. 4, 2021 issued in U.S. Appl. No. 16/809,291.
Notice of Allowance dated Sep. 22, 2021 issued in U.S. Appl. No. 16/829,824.
Office Action dated Sep. 29, 2021 issued in U.S. Appl. No. 16/783,990.
Office Action dated Nov. 24, 2021 issued in U.S. Appl. No. 16/809,291.
Office Action dated Dec. 21, 2021 issued in U.S. Appl. No. 16/783,912 .
Notice of Allowance dated Dec. 17, 2021 issued in U.S. Appl. No. 16/783,990.
Notice of Allowance dated May 5, 2022 issued in U.S. Appl. No. 16/828,663.

* cited by examiner

DRIVING CONTROL APPARATUS FOR VEHICLE

TECHNICAL FIELD

The present invention relates to a driving control apparatus for a vehicle, and more particularly, relates to an override function in a partially automated in-lane driving system.

BACKGROUND ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" based on these techniques are being promoted.

Such a driving control system is only for the purpose of driving support and is different from completely automatic driving. A driver is required to place hands on the steering wheel and keep track of the driving situation so as to be able to manually drive at any time, the driver needs to respond in accordance with the situation, and the driving control system has an override function that switches to manual driving by the driver's operation intervention even while the system is operating. Patent Literature 1 discloses a vehicle lateral movement control device that determines change speed (fallback speed) of a fallback control amount to shift to manual driving according to change speed of a steering operation amount input by a driver.

CITATION LIST

Patent Literature

[Patent Literature 1] JP 2012-096569 A

SUMMARY OF INVENTION

Problems to be Solved by the Invention

In Patent Literature 1, if the change in speed of the steering operation amount is large, it is regarded as steering intervention intended by the driver and driving is shifted to manual driving in a short time, and if the change in speed of the steering operation amount is small, fallback control is performed relatively taking more time, and driving is shifted to manual driving. However, the large change in speed of the steering operation amount does not necessarily mean steering intervention intended by the driver, nor does fallback control corresponding to the change in speed of the steering operation amount necessarily mean control suitable for the movement state of the vehicle.

For example, if curvature of a curve or lateral acceleration exceeds a limit value of the LKAS while a partially automated in-lane driving function is operating, LKA and ACC shift to a fallback control mode, the driver is notified of ACC and LKA function stop and an operation takeover request (takeover request), and ACC and LKAS fallback control is started after the elapse of several seconds.

When the driver is notified of the LKA and ACC function stop and the operation takeover request due to the system limit of the LKAS, it may be assumed that behavior of the vehicle becomes unstable due to LKA override by excessive steering operation and ACC override by excessive brake operation/accelerator operation of the driver who is overwhelmed by the notification.

For example, as shown in FIG. 6(a), if a curvature of a curve 1/R exceeds the limit value of the LKAS during right automatic steering for lane keeping, the driver is notified of the LKA and ACC function stop and the steering and braking/driving takeover request, and if the driver who is overwhelmed by the notification performs excessive brake operation (ACC brake override), sudden deceleration of the vehicle may cause the behavior to become unstable. In addition, as shown in FIG. 6(b), if the driver who is overwhelmed by the notification performs excessive accelerator operation (ACC accelerator override), sudden acceleration of the vehicle may cause the vehicle to deviate from its lane.

As shown in FIG. 7(a), if the driver who is overwhelmed by the above-described notification performs excessive right steering (LKA additive steering override), sudden steering may cause the vehicle to deviate to a right lane. In addition, as shown in FIG. 7(b), if the driver who is overwhelmed by the notification performs excessive left steering (LKA subtractive steering override), sudden steering may cause the vehicle to deviate to a left lane.

The present invention has been made in view of the above-described actual situation, and an object is to provide a driving control apparatus for a vehicle that prevents sudden acceleration/deceleration and lane departure due to excessive operation intervention during a transition process to LKA and ACC fallback control at the time of LKA system limit.

Means for Solving the Problems

In order to solve the above-described problems, the present invention is a driving control apparatus for a vehicle, including:

an environmental condition estimating part including a surrounding recognition function for recognizing a vehicle's driving lane and other vehicles driving in the driving lane and a function for obtaining the vehicle's moving state;

a path generating part for generating a target path on the basis of information obtained by the environmental condition estimating part; and a vehicle control part configured to perform speed control for keeping a preset target speed or target inter-vehicle distance with a preceding other vehicle and steering control for causing the vehicle to follow the target path, and having:

an ACC function for performing constant speed cruise according to the target speed when there is no preceding other vehicle in the vehicle's driving lane and performing following cruise by maintaining the predetermined inter-vehicle distance when there is a preceding other vehicle;

an LKA function for maintaining cruise in the vehicle's driving lane by following control to the target path;

an override function for stopping the ACC function and the LKA function by a driver's operation intervention; and at a time of system limit of the LKA function, a function for notifying the driver of stopping the LKA function and the ACC function and operation takeover and performing fallback control of the LKA function and the ACC function, wherein override threshold values serving as a determination criterion of the operation intervention for stopping the LKA function and the ACC function at the time of system limit of the LKA function are configured to be altered to a value greater than during normal operation when the LKA function is within the system limit.

Advantageous Effects of Intervention

According to the driving control apparatus for the vehicle according to the present invention, because the override threshold value serving as the determination criterion of the operation intervention at the time of system limit of the LKA function is altered to a value greater than during normal operation when the LKA function is within the system limit, if a driver who is overwhelmed by LKA and ACC function stop and operation takeover notice performs excessive operation intervention, override can be avoided, which enables shift to fallback control of the LKA function and the ACC function, can prevent sudden acceleration/deceleration and lane deviation due to excessive operation intervention, and is advantageous in smooth operation takeover.

MODE FOR CARRYING OUT THE INVENTION

Hereinafter, an embodiment of the present invention will be described in detail with reference to the drawings.

Figure 1:
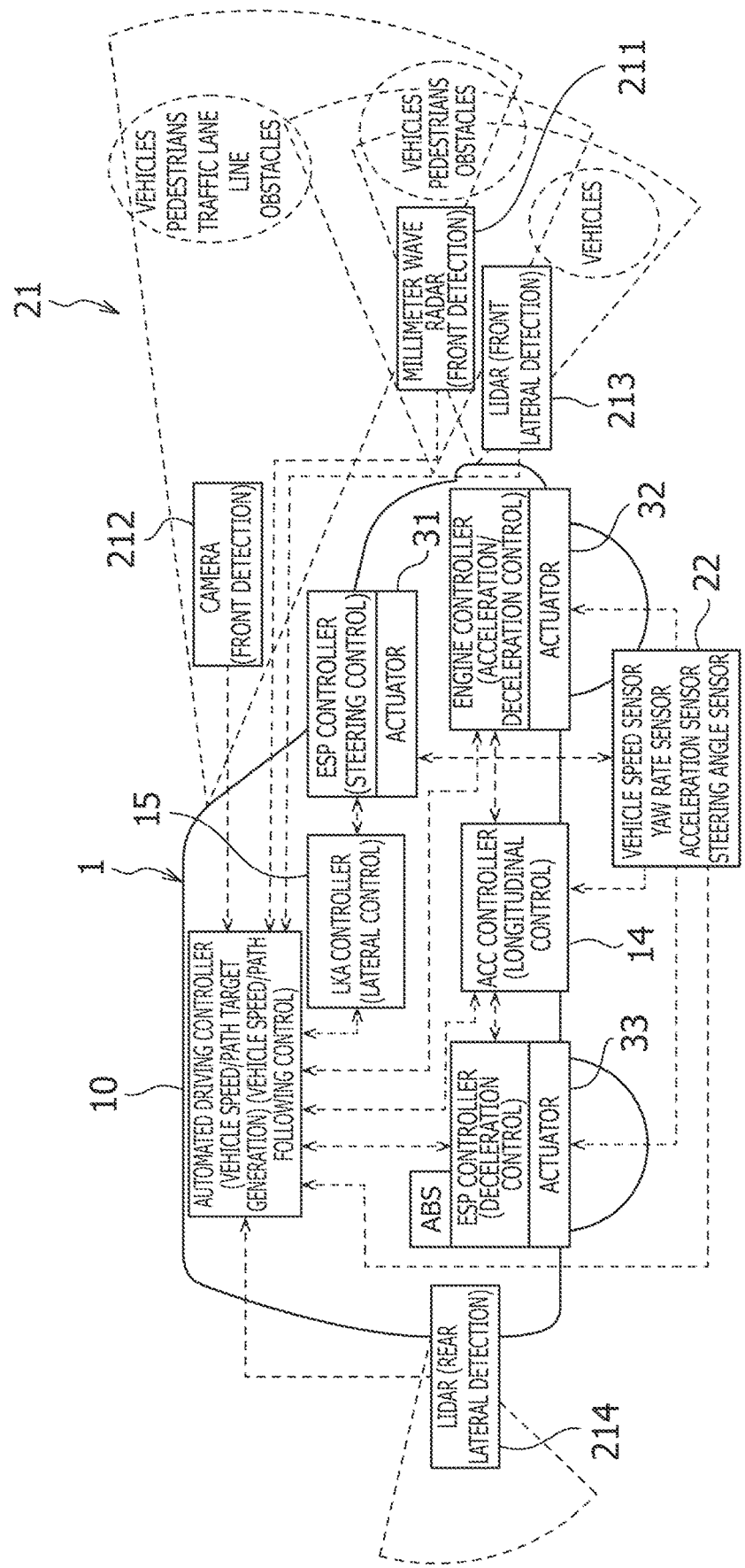
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them and performing path following control in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
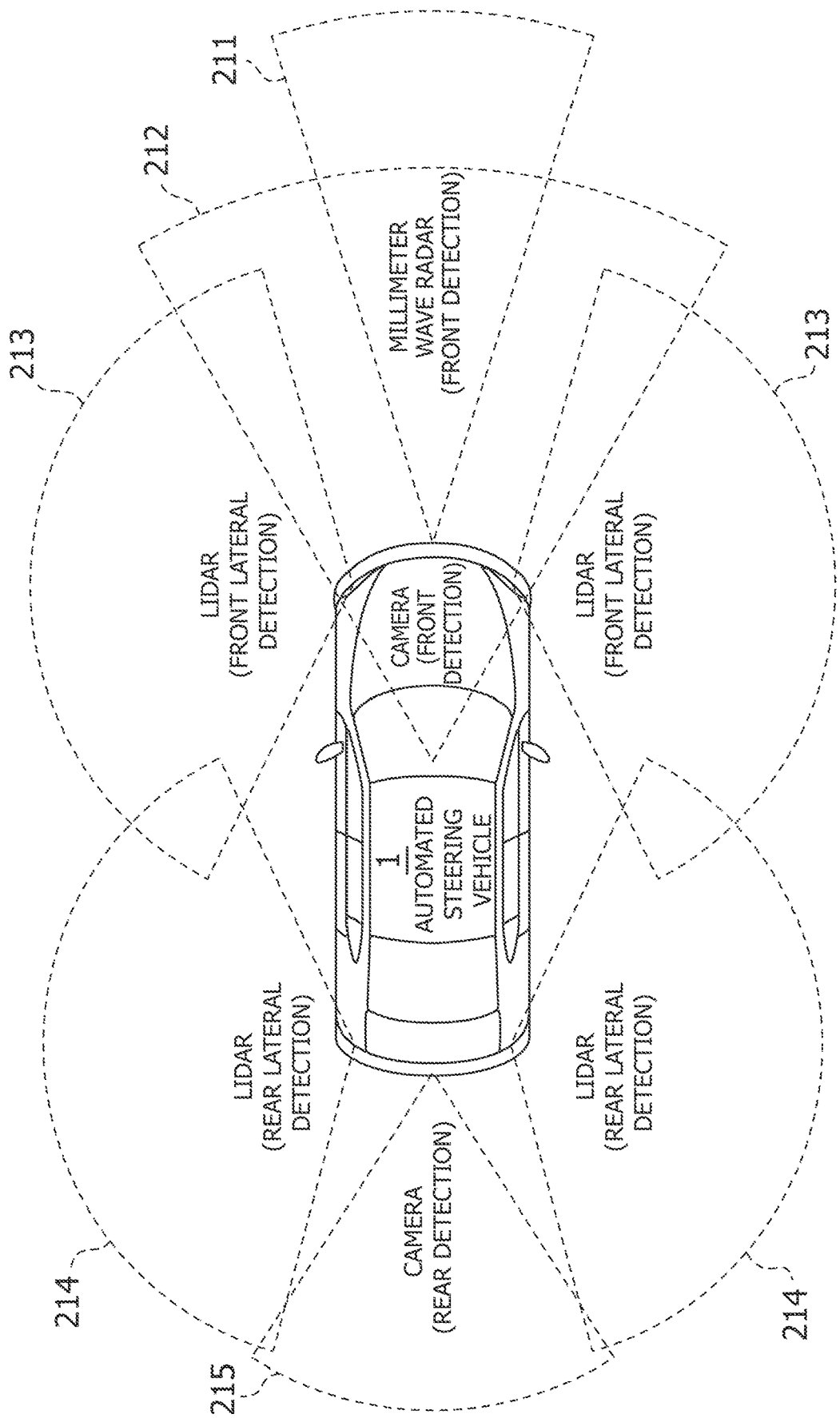
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
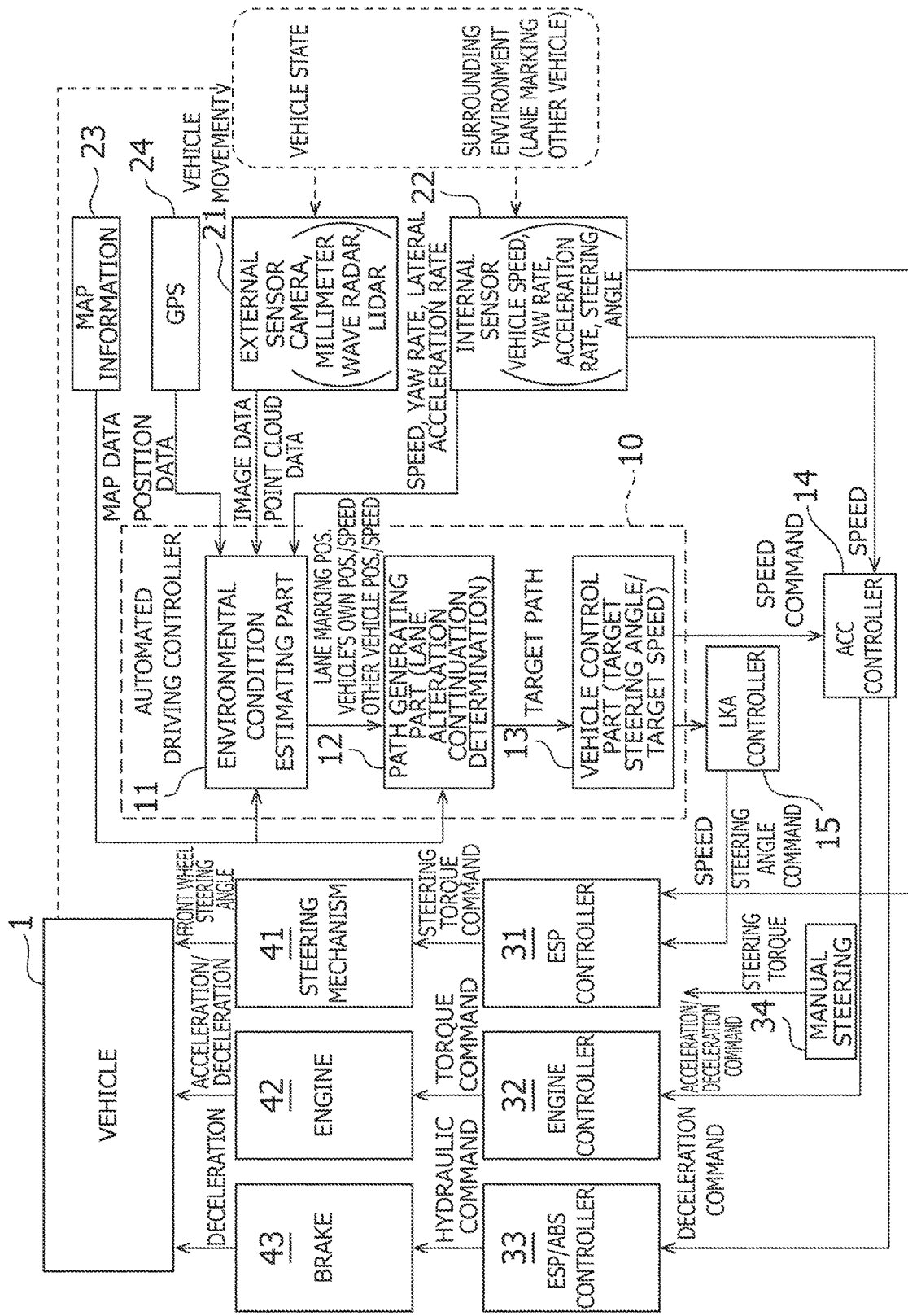
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by using positioning means 24 such as a GPS, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

(Outline of Partially Automated In-Lane Driving System)

Next, an outline of a partially automated in-lane driving system (PADS) will be explained on the assumption of traveling within a single lane while following a vehicle ahead on a highway.

Partially automated in-lane driving (PADS driving) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after $\Delta t$ seconds from a relationship between a yaw rate $\gamma$ and lateral acceleration ($d^2y/dt^2$) occurring due to vehicle movement by the vehicle's own position and movement characteristics of the vehicle itself, that is, a front wheel steering angle $\delta$ occurring when a steering torque T is applied to the steering mechanism 41 during traveling at a vehicle speed V, gives a steering angle command that makes the lateral displacement to "yt" after $\Delta t$ seconds to the EPS controller 31 via the LKA controller 15, and gives a speed command that makes the speed to "Vt" after $\Delta t$ seconds to the ACC controller 14.

During partially automated in-lane driving, the automated driving controller 10 recognizes a vehicle ahead in the lane and lane markings of the lane by the external sensor 21 and constantly monitors the vehicle itself to follow the generated target path.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) is operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

(System Limit Detection and Monitoring)

The ACC function (ACCS) and LKA function (LKAS) each have a system operation design domain defined within which the system can stably operate, and during the operation of the partially automated in-lane driving function (PADS), the environmental condition estimating part 11 constantly monitors whether the vehicle state is within a system limit on the basis of the external information (lanes, vehicle position, positions and speeds of other vehicles driving in the lane and the neighboring lane, and road structure) obtained through the external sensor 21 and the vehicle information (vehicle speed, yaw rate, acceleration, and lateral acceleration) obtained by the internal sensor 22.

In particular, a state quantity that causes the system limit to the LKA function (LKAS) is when the lateral acceleration is equal to or greater than a predetermined value, and an environmental condition having an impact on the lateral acceleration includes a case in which a curvature of a curve (1/R) is equal to or greater than a predetermined value. The curvature of a curve can be directly calculated from coordinate point data on a curve section obtained from the map information 23, and the curve section can be identified on the basis of the absolute position of the vehicle detected by the positioning means 24 such as the GPS. The curvature of a curve can also be estimated from a road shape (lanes and lane markings) obtained by the environmental condition estimating part 11 through the external sensor 21 and the target path generated by the path generating part 12 on the basis of the road shape.

(Override Function)

During the operation of the partially automated in-lane driving function (PADS), both longitudinal control system (ACCS) and lateral control system (LKAS) can be overridden by the driver.

The longitudinal control system (ACCS) is overridden if an engine torque request by accelerator pedal operation of the driver or a deceleration request by brake pedal operation is equal to or greater than a corresponding override threshold value. These override threshold values are set to an accelerator operation amount (engine torque command value) or a brake operation amount (ESP hydraulic command value) based on which it is determined that the driver has intentionally performed acceleration/deceleration operation, and both are set according to the acceleration/deceleration characteristic and driving state of the vehicle.

That is, the ACC override stops ACC control if an operation amount or operation speed based on which it is determined that the driver has performed accelerator pedal operation or brake pedal operation with an intention of acceleration or deceleration with respect to the control vehicle speed is applied to the accelerator pedal or brake pedal, and shifts to driving by the driver's accelerator and brake operation.

The lateral control system (LKAS) is overridden if a steering torque by the driver's manual steering 34 is equal to or greater than the override threshold value. The override threshold value by the steering intervention is set according to the steering characteristic and driving state of the vehicle.

That is, the steering override stops LKA control if an operation amount or operation speed based on which it is determined that the driver has performed steering with an intention of additive steering (in the same direction) or subtractive steering (in the opposite direction) with respect to the control steering torque is applied to a steering system, and shifts to driving by the driver's manual steering.

(Shift to LKA and ACC Fallback Control Mode at LKAS System Limit)

During the operation of the partially automated in-lane driving system (PADS), if the curvature of a curve (1/R) or lateral acceleration exceeds LKAS limit values, the partially automated in-lane driving function (LKA function and ACC function) is stopped at the same time as the system limit, the LKAS and ACCS shift to a fallback control mode, the driver is notified of LKA and ACC function stop and an operation takeover request (takeover request), and LKA and ACC fallback control is started after the elapse of a prescribed waiting time (for example, four seconds).

The ACC fallback control gradually decreases an acceleration/deceleration command value (vehicle speed command) input into the engine controller 32 to 0 km/h/s with a predetermined inclination, and also gradually decreases a deceleration command value input into the ESP controller to 0 m/s$^2$ with a predetermined inclination.

The LKAS fallback control gradually decreases a steering torque command value (steering angle command) input into the EPS controller to 0 Nm with a predetermined inclination. When the LKAS and ACC fallback control ends, the steering operation and accelerator/brake operation are taken over by the driver.

As described above, when the LKAS system limit has been reached during the operation of the partially automated in-lane driving function, the ACC function and LKA function are stopped, the longitudinal control and lateral control by those are taken over by the driver; and at that time as already described above, by the driver who has been overwhelmed by the function stop and takeover request notice, lane departure due to excessive steering intervention (LKA override) and sudden acceleration/sudden deceleration behavior due to excessive accelerator/brake operation intervention (ACC override) may occur.

(Excessive Operation Prevention Function at LKAS System Limit)

The automated driving controller 10 according to the present invention has an excessive operation prevention function that, at the time of the LKA and ACC function stop and the takeover of steering and braking/driving by the driver when the LKAS system limit has been reached during the operation of the partially automated in-lane driving function, changes the ACC override threshold value and LKA override threshold value to values greater than during normal operation within the LKAS system limit in a period from the partially automated in-lane driving function stop (LKA and ACC function stop advance notice) to the LKA and ACC function stop (for example, elapse of four seconds after notification-LKA and ACC fallback control start-LKA and ACC fallback control end).

By increasing the ACC override threshold value and LKA override threshold value at the time of LKAS system limit, an override state is avoided and the ACC and LKA control is continued, thereby sudden acceleration/deceleration and sudden steering are suppressed, and lane departure and the like can be avoided even if the driver who has been overwhelmed by the system limit notification performs excessive accelerator/brake operation intervention or steering intervention and applies a large operation amount that would lead to sudden acceleration/deceleration and lane departure before threshold value change.

1. ACC Override Threshold Value

First, an excessive operation prevention function by changing the ACC override threshold value will be described below. An excessive steering prevention function by changing the LKA override threshold value will be described later.

(Accelerator Override Threshold Value within LKAS System Limit/during Normal Operation)

If an engine torque command value by the driver's accelerator depression is greater than an engine torque command value for maintaining ACC set speed (cruise set speed or vehicle ahead following speed) or ACC set acceleration, accelerator override is reached and the driver's accelerator operation is given priority. The threshold value is obtained from an engine torque map set according to a vehicle speed and gear position, and an engine torque command value that gives acceleration corresponding to, for example, a speed of 4 km/h, to the ACC set speed or an engine torque command value causing acceleration corresponding to 0.3 m/s$^2$ to the ACC set acceleration is set as a threshold value Td.

(Brake Override Threshold Value within LKAS System Limit/during Normal Operation)

If an ESP hydraulic command causing deceleration with respect to the ACC set speed (cruise set speed or vehicle ahead following speed) or ACC set acceleration is given by the driver's brake depression, brake override is reached and the driver's brake operation is given priority. An ESP hydraulic command value that causes deceleration corresponding to, for example, a speed of 2 km/h with respect to the ACC set speed or an ESP hydraulic command value that causes deceleration corresponding to 0.2 m/s$^2$ with respect to the ACC set acceleration is set as a threshold value Pd.

(Accelerator Override Threshold Value at LKAS System Limit)

A value greater than the ACC accelerator override threshold value during normal operation, preferably in the range of 120% to 250%, and more preferably in the range of 150% to 220% of the ACC accelerator override threshold value during normal operation is selected. For example, an engine torque command value that gives acceleration corresponding to a speed of 8 km/h with respect to the ACC set speed or an engine torque command value that causes acceleration corresponding to 0.6 m/s$^2$ with respect to the ACC set acceleration is set as a threshold value TL.

(Brake Override Threshold Value at LKAS System Limit)

A value greater than the ACC brake override threshold value during normal operation, preferably in the range of 120% to 250%, and more preferably in the range of 150% to 220% of the ACC brake override threshold value during normal operation is selected. For example, an ESP hydraulic command value that causes deceleration corresponding to a speed of 4 km/h with respect to the ACC set speed or an ESP hydraulic command value that causes deceleration corresponding to 0.4 m/s$^2$ with respect to the ACC set acceleration is set as a threshold value PL.

(ACC Override Threshold Value Change Flow at LKAS System Limit)

Figure 4:
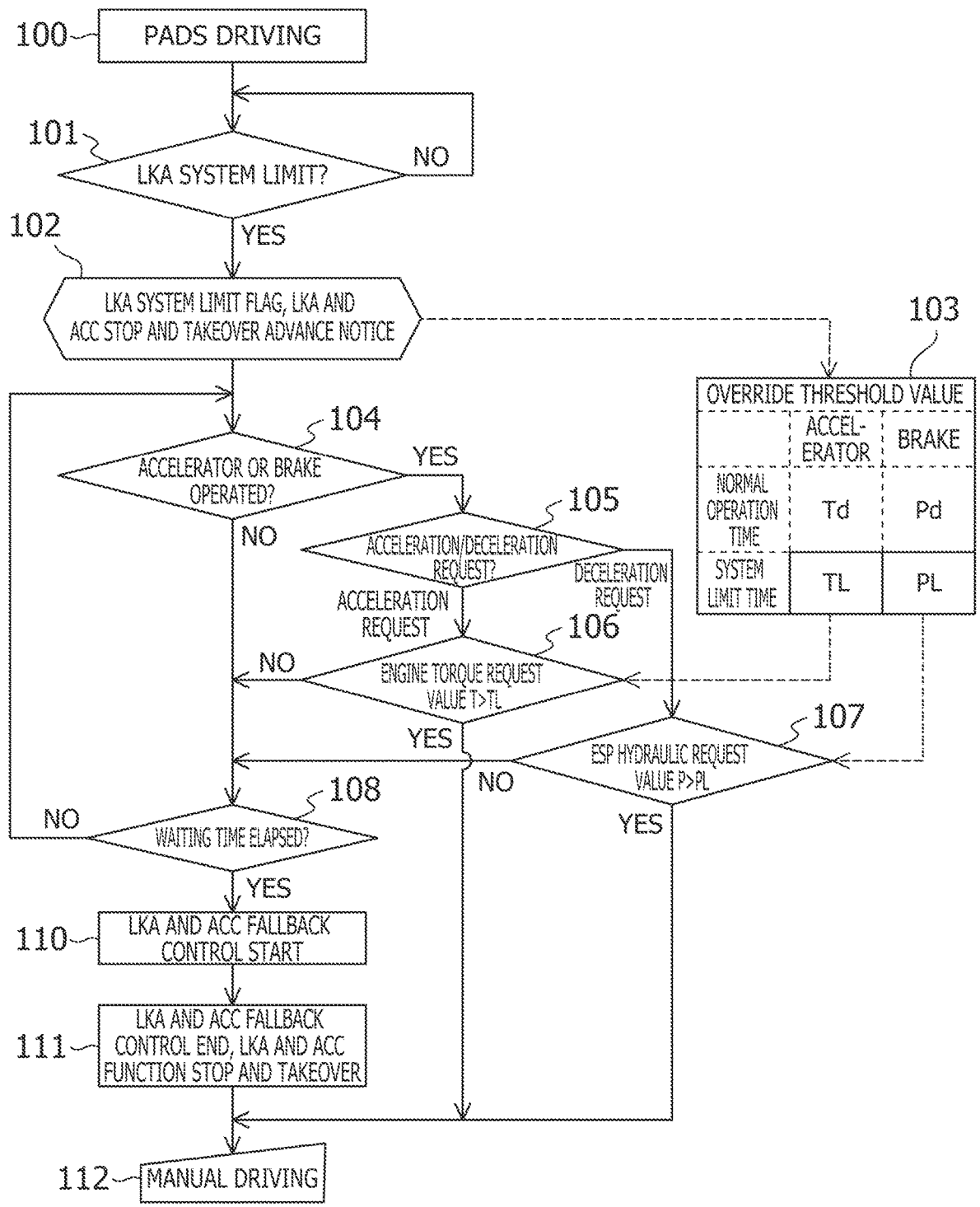
FIG. 4 is a flowchart showing excessive accelerator/brake override prevention control at a time of LKA system limit.

Next, a flow at the time of the LKAS system limit will be described with reference to FIG. 4.

(1.1) Driving by Partially Automated In-Lane Driving System (PADS Driving)

When PADS driving is selected by the driver's operation, the ACCS and LKAS are activated after a system check, being PADS driving is displayed in a meter panel or the like (step 100). During PADS driving, the ACCS and LKAS work together, and perform constant speed cruise at the target speed (cruise set speed) keeping within a single lane or perform following cruise maintaining a predetermined inter-vehicle distance. In this case, a target path within a lane is set to the center of lane markings, a predetermined offset distance from a left or right lane marking, or the like.

(1.2) LKAS System Limit Determination

During PADS (ACCS and LKAS) driving, lateral acceleration or curvature of a curve is detected by the external sensor 21 and internal sensor 22 and it is constantly monitored whether the state of the vehicle is within the LKA system limit (step 101).

(1.3) LKAS System Limit

During PADS (ACCS and LKAS) driving, if the curvature of a curve or lateral acceleration exceeds the set limit value and the LKAS system limit is reached, an LKAS system limit flag is set (step 102).

(1.4) LKAS System Limit Notice, LKA and ACC Function Stop and Takeover Advance Notice At the same time, the driver is notified of occurrence of LKAS system limit, LKA and ACC function stop, and operation takeover advance notice by display in a head-up display or meter panel or voice. At the same time, counting of a waiting time (for example, four seconds) until shift to LKA and ACC fallback control is started.

(1.5) ACC Override Threshold Value Change

At the same time, the accelerator override threshold value Td and brake override threshold value Pd of the ACC within LKAS system limit/during normal operation are altered to the accelerator override threshold value TL (TL>Td) and brake override threshold value PL (PL>Pd) at the time of system limit, respectively (step 103).

(1.6) Determination of Whether Accelerator and Brake Operation Is Performed

At this time point, the ACC is still operating, and whether accelerator operation or brake operation is performed by the driver is determined with position sensors attached to accelerator and brake pedals (step 104).

(1.7) Acceleration/Deceleration Request Determination

When the accelerator operation or brake operation by the driver is detected, it is determined whether the override by the driver is an acceleration request or a deceleration request (step 105).

(1.8) Accelerator Override Determination

In the case of the acceleration request, the engine torque command value by the driver's accelerator depression is compared with the override threshold value TL (step 106).

i) If the engine torque command value T>the override threshold value TL, it is determined that the operation is accelerator override and the override is carried out immediately, shifting to manual driving.

ii) If the engine torque command value T≤TL, the override is not carried out, and LKA and ACC driving continues.

(1.9) Brake Override Determination

In the case of the deceleration request, the ESP hydraulic command value by the driver's brake depression is compared with the override threshold value PL (step 107).

i) If the ESP hydraulic command value P>PL, it is determined that the operation is brake override and the override is carried out immediately, shifting to manual driving.

ii) If the ESP hydraulic command value P≤PL, the override is not carried out, and LKA and ACC driving continues.

(1.10) Determination of Takeover Elapsed Time-LKA and ACC Fallback Control Start In the case of continuing LKA and ACC driving, counting of an elapsed time from the notification of the LKA and ACC takeover advance notice in the step 102 is continued (step 108), and LKA and ACC fallback control is started when the waiting time (four seconds) passes (step 110).

ACC fallback control: an acceleration/deceleration command value (vehicle speed command) input into the engine controller 32 is gradually decreased to 0 km/h/s with a predetermined inclination, and also a deceleration command value input into the ESP controller 33 is decreased to 0 m/s$^2$ with a predetermined inclination. LKA fallback control: a steering torque command value input into the EPS controller is gradually decreased to 0 Nm with a predetermined inclination.

(1.11) LKA and ACC Fallback Control End-LKA and ACC Function Stop and Operation Takeover When the LKA and ACC fallback control ends, the LKA and ACC functions are stopped and operation takeover to the driver is performed (step 111), shifting to manual driving by the driver's accelerator/brake operation and steering (step 112).

2. LKA Override Threshold Value

The excessive steering prevention function by the LKA override threshold value change will be described below.

(Steering Override Threshold Value within LKAS System Limit/during Normal Operation)

For an additive steering override threshold value during normal operation when the LKAS is within the system limit, a steering torque (steering torque calculated from the vehicle speed-steering angle-steering torque map) corresponding to a steering angle by which a virtual lateral displacement "y't" for reaching a virtual lateral position after "t" seconds becomes "yt+α" is set as an additive steering override threshold value T1d, where "α" is a constant determined based on vehicle speed.

In the case of subtractive steering, a value that is perceptible (determined by the steering angle, steering angle speed, or the like) and is applied in a direction of reducing the steering torque to a value (steering torque target value) obtained by converting a steering angle by which a virtual lateral displacement "yt" for reaching a virtual lateral position after "t" seconds becomes "yt+α" into a steering torque is set as a subtractive steering override threshold value T2d, where "α" is a constant determined based on vehicle speed.

(Steering Override Threshold Value at LKAS System Limit)

For an additive steering override threshold value, a value obtained by converting a steering angle calculated from virtual lateral displacement "y"t" (=yt+β, where β>α) at the time of system limit and the movement characteristics of the vehicle with respect to the virtual lateral displacement "yt" within the LKAS system limit/during normal operation into a steering torque is set as an additive steering override threshold value T1L.

For a subtractive steering override threshold value, a value obtained converting a steering angle calculated from virtual lateral displacement "y″t" (=yt−γ, where "γ" is greater than a lateral displacement corresponding to a steering torque X' Nm) at the time of system limit and the movement characteristic of the vehicle with respect to the virtual lateral displacement "yt" within the LKAS system limit/during normal operation into a steering torque is set as a subtractive steering override threshold value T2L.

(LKA Override Threshold Value Change Flow at LKAS System Limit)

Figure 5:
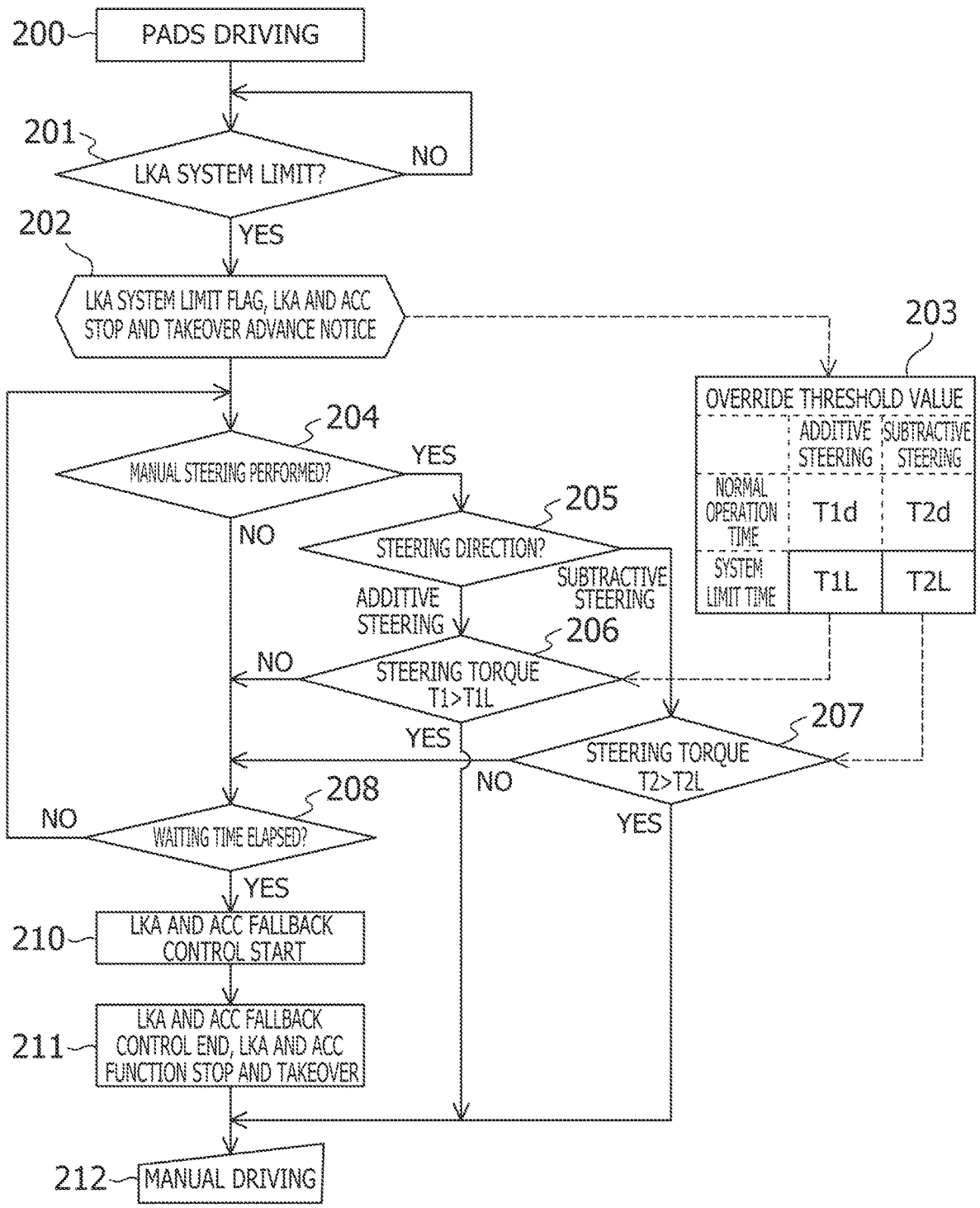
FIG. 5 is a flowchart showing excessive additive/subtractive steering override prevention control at the time of LKA system limit.
Figure 6A:
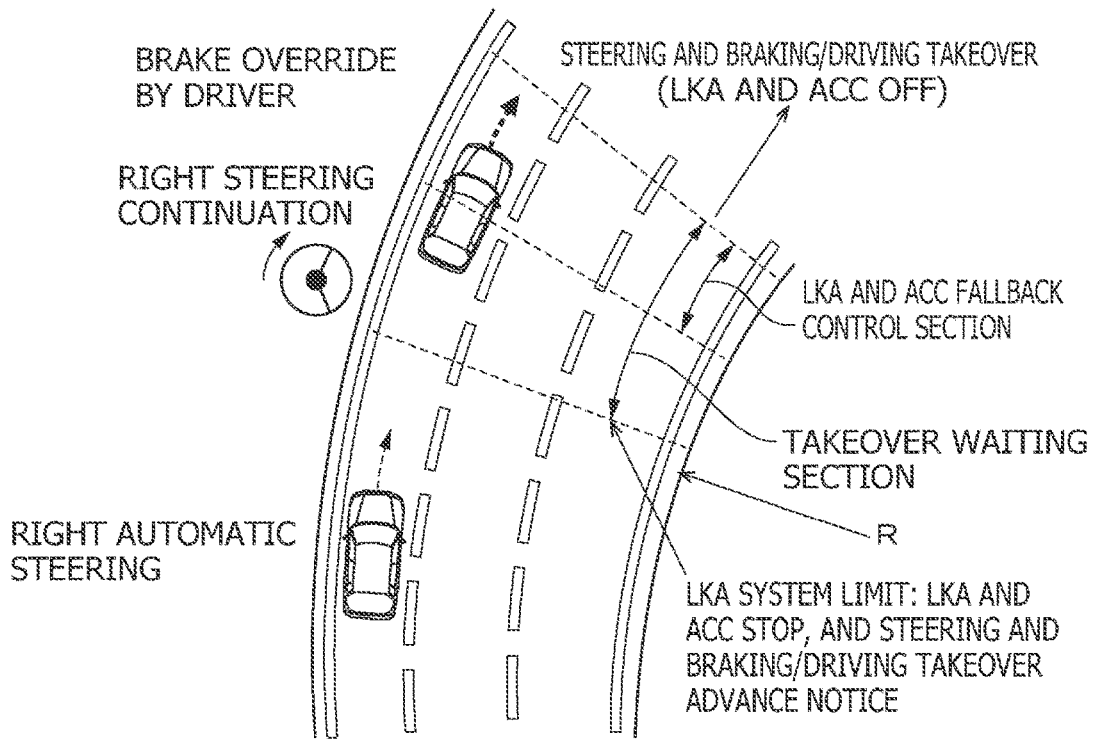
FIG. 6 is a schematic plan view exemplifying (a) sudden deceleration due to excessive brake override and (b) sudden acceleration due to excessive accelerator override at the time of LKA system limit.
Figure 6B:
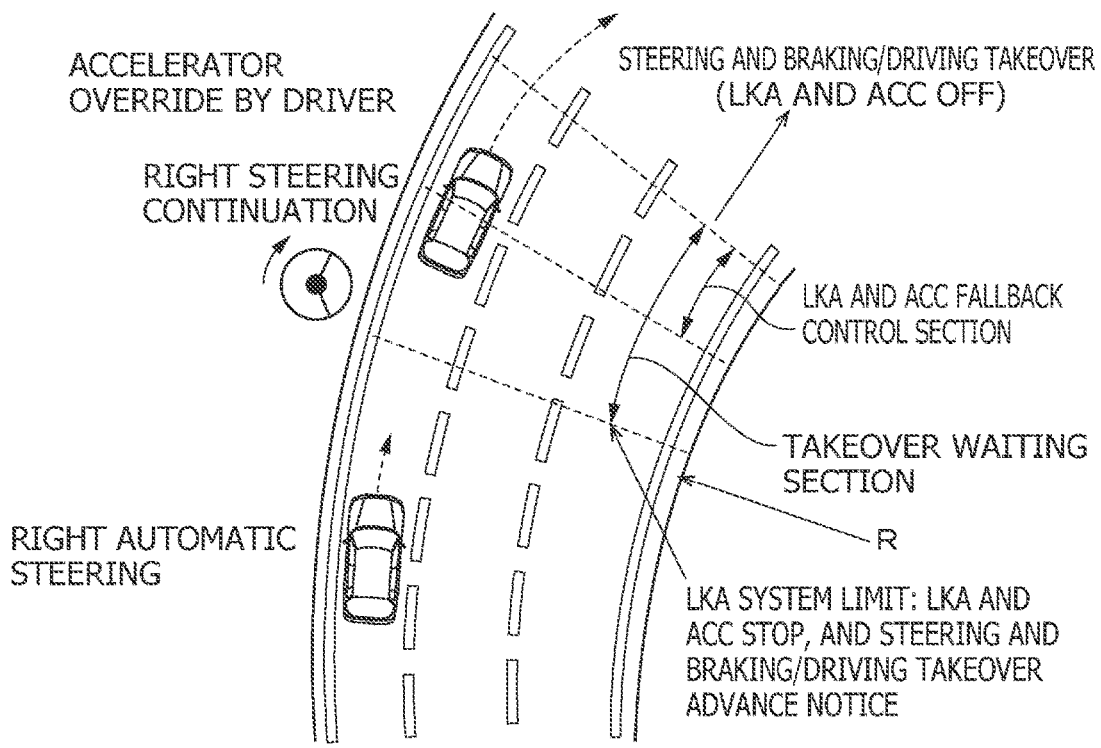
Figure 7A:
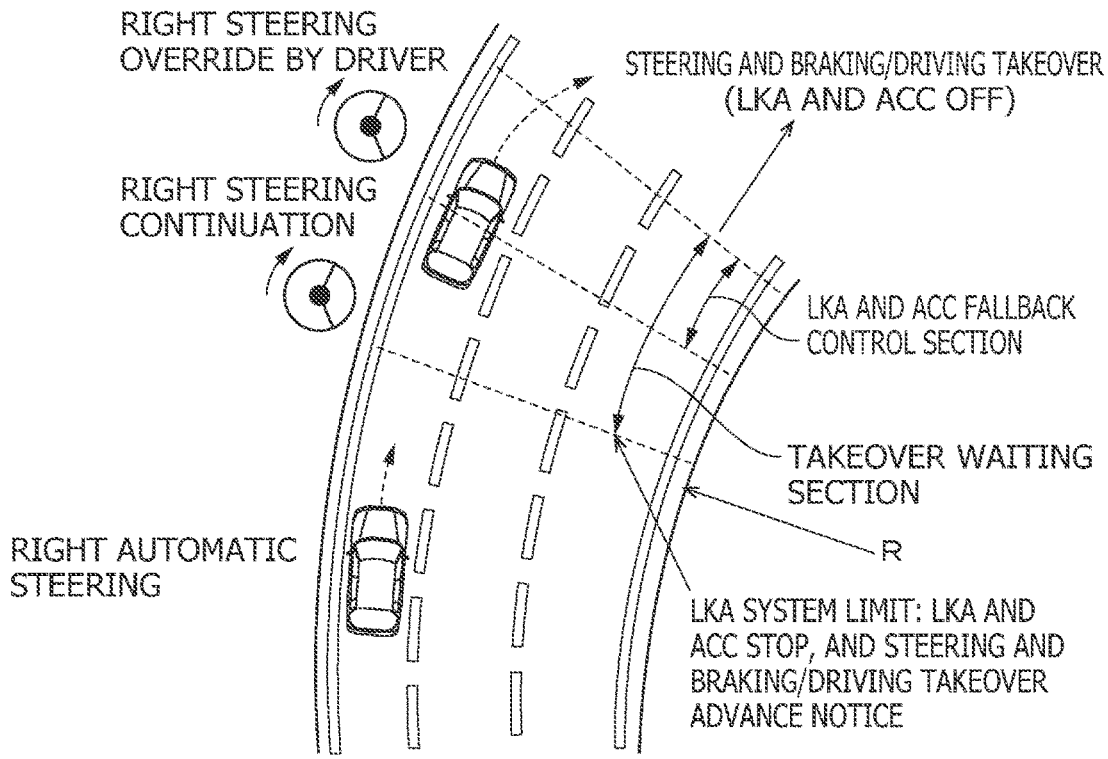
FIG. 7 is a schematic plan view exemplifying (a) lane deviation due to excessive additive steering override and (b) lane deviation due to excessive subtractive steering override at the time of LKA system limit.
Figure 7B:
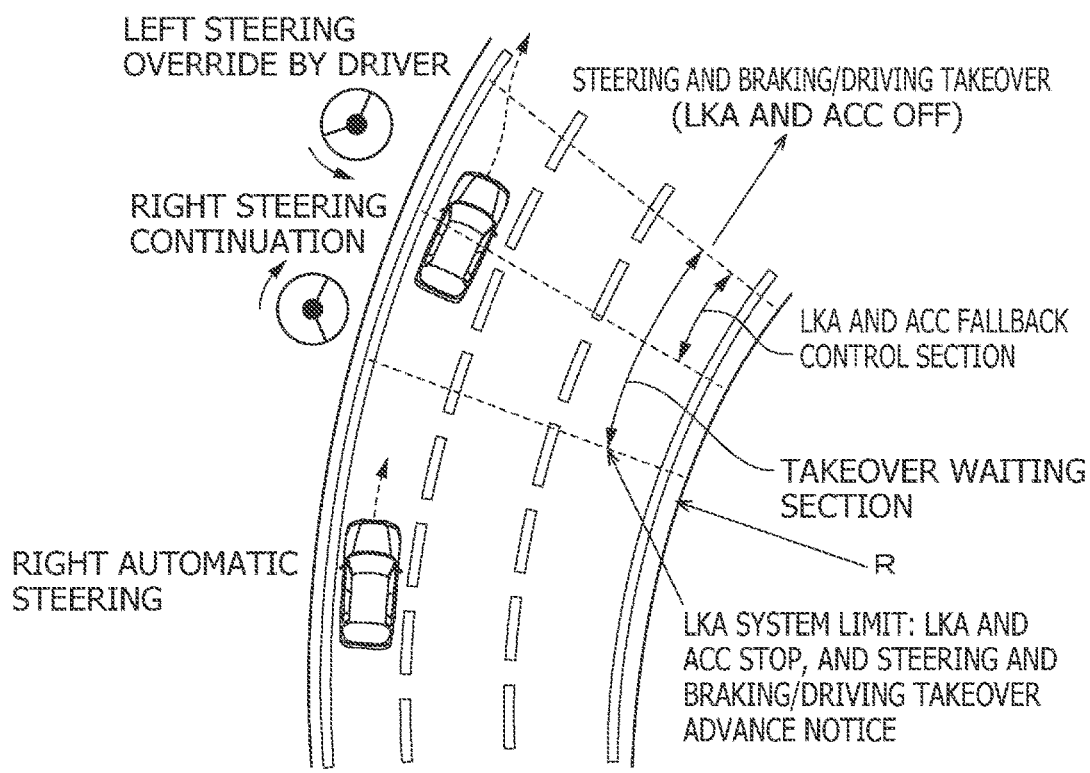

Next, an LKA override threshold value change flow at the time of LKAS system limit will be described with reference to FIG. 5. A basic flow is the same as the excessive operation prevention function by the above-described ACC override threshold value change.

(2.1) Driving by Partially Automated In-Lane Driving System (PADS Driving)

When PADS driving is selected by the driver's operation, the ACCS and LKAS are activated after a system check, being PADS driving is displayed in the meter panel or the like (step 200). During PADS driving, the ACCS and LKAS work together, and perform constant speed cruise at the target speed (cruise set speed) keeping within a single lane or perform following cruise maintaining the predetermined inter-vehicle distance. In this case, the target path within a lane is set to the center of the lane (driving lane), the predetermined offset distance from a left or right lane marking, or the like.

(2.2) LKAS System Limit Determination

During PADS (ACCS and LKAS) driving, lateral acceleration or curvature of a curve is detected by the external sensor 21 and internal sensor 22 and it is constantly monitored whether the state of the vehicle is within the LKA system limit (step 201).

(2.3) LKAS System Limit

During PADS (ACCS and LKAS) driving, if the curvature of a curve or lateral acceleration exceeds the set limit value and the LKAS system limit is reached, an LKAS system limit flag is set (step 202).

(2.4) LKAS System Limit Notice, LKA and ACC Function Stop and Takeover Advance Notice At the same time, the driver is notified of occurrence of the LKAS system limit, LKA and ACC function stop, and operation takeover advance notice by display in the head-up display or meter panel or voice. At the same time, counting of the waiting time (for example, four seconds) until shift to LKA and ACC fallback control is started.

(2.5) LKA Override Threshold Value Change

At the same time, the steering override threshold values (additive direction T1d and subtractive direction T2d) within LKAS system limit/during normal operation are altered to the steering override threshold values (additive direction T1L and subtractive direction T2L) at the time of system limit (step 203).

That is, a value is calculated that is obtained by converting a steering angle calculated from lateral movement distance "yt" at this time point and the movement characteristics of the vehicle into a steering torque, and the steering override threshold values (additive direction T1L and subtractive direction T2L) at the time of LKAS system limit are set.

(2.6) Determination of Whether Manual Steering Is Performed

At the same time, whether manual steering 34 is performed is determined with a torque sensor attached to the EPS controller 31 (step 204).

(2.7) Steering Direction Determination

When it is determined that manual steering is performed from a detection value of the torque sensor attached to the EPS controller 31, a steering direction of the manual steering 34 is determined (step 205).

For the determination of the steering direction, it is determined to be additive steering if the torque is applied to the steering torque value calculated in the step 203 in a direction of increasing the steering torque, and it is determined to be subtractive steering if the torque is applied in a direction of decreasing the steering torque.

(2.8) Override Determination

It is determined whether the steering torque of the manual steering 34 exceeds the override threshold value.

(2.8-1) Additive Steering Override Determination

If the steering direction is determined to be additive steering in the steering direction determination, the steering torque is compared with the additive steering override threshold value T1L (step 206).

i) If the steering torque>the additive steering override threshold value T1L, it is determined that the operation is override and the override is carried out immediately, shifting to manual driving.

ii) If the steering torque<the additive steering override threshold value T1L, the override is not carried out, and LKA and ACC driving continues.

(2.8-2) Subtractive Steering Override Determination

If the steering direction is determined to be subtractive steering in the steering direction determination, the steering torque is compared with the subtractive steering override threshold value T2L (step 207).

i) If the steering torque>the subtractive steering override threshold value T2L, it is determined that the operation is override, and the override is carried out immediately, shifting to manual driving.

ii) If the steering torque<the subtractive steering override threshold value T2L, the override is not carried out, and LKA and ACC driving continues.

(2.9) Determination of Takeover Elapsed Time-LKA and ACC Fallback Control Start

In the case of continuing LKA and ACC driving, counting of an elapsed time from issuing the steering takeover notice in the step 202 is continued (step 208), and LKA and ACC fallback control is started after the waiting time (four seconds) passes (step 210).

ACC fallback control: the acceleration/deceleration command value (vehicle speed command) input into the engine controller 32 is gradually decreased to 0 km/h/s with the predetermined inclination, and also the deceleration command value input into the ESP controller 33 is decreased to 0 m/s$^2$ with the predetermined inclination. LKA fallback control: the steering torque command value input into the EPS controller is gradually decreased to 0 Nm with the predetermined inclination.

(2.10) LKAS Fallback Control End and Function Stop and Steering Takeover

When the LKA and ACC fallback control ends, the LKA and ACC functions are stopped and operation takeover to the driver is performed (step 211), shifting to manual driving by the driver's accelerator/brake operation and steering (step 212).

Although override by excessive steering at the time of LKAS system limit can be basically prevented by the over-ride threshold value change as described above, if the manual steering is equal to or greater than the override threshold value in the above-described override determination (steps 206 and 207), the LKA function will be overridden by the manual steering.

When the override threshold value at the time of LKAS system limit is altered (step 203), by changing an upper limit value of the steering torque or steering angle (in inverse proportion to vehicle speed/decreases as vehicle speed increases) set according to vehicle speed by the EPS controller 31 to a value lower than during normal operation within the LKAS system limit, excessive steering can be prevented when it is overridden by the manual steering.

When the override threshold value at the time of LKAS system limit is altered (step 203), by changing a steering gain of the manual steering to a small value by the EPS controller 31, it is also possible to partially reflect the steering amount on the steering torque when it is overridden by the manual steering.

(Operation and Effects)

As detailed above, because the driving control apparatus for the vehicle according to the present invention is configured so that the override threshold values serving as a determination criterion of operation intervention to stop the LKA function and ACC function if the LKAS system limit is reached during the operation of the partially automated in-lane driving system (PADS) are altered to greater values than during normal operation when the LKAS is within the system limit, even if the driver who is overwhelmed by the LKA and ACC function stop and the operation takeover notice performs excessive operation intervention (accelerator/brake operation and additive/subtractive steering), override is avoided, which enables shift to fallback control in the state of continuing the LKA and ACC function, can prevent sudden acceleration/deceleration and sudden steering due to the excessive operation intervention, and is advantageous in smooth operation takeover.

Because the override threshold values at the time of LKAS system limit are kept from the notification of the LKA and ACC function stop and the operation takeover to end of the fallback control, operation takeover can be gradually performed in a state in which steering control by the LKA function and acceleration/deceleration control by the ACC function are partially active, smooth operation takeover can be performed, and in addition, because the override threshold value during normal operation is restored when LKA and ACC fallback control is finished and shift to manual driving is completed, and thereby, the state of being capable of override by operation intervention during normal operation is immediately reached when it is returned to within the LKAS system limit.

In the above-described embodiment, the ACC override threshold value change and the LKA override threshold value change are shown in separate flowcharts (FIG. 4 and FIG. 5), but these can be integrated and described as one flow, and in that case, the step 104 and step 204 may be integrated to make three branches or the step 204 can be described before or after the step 104.

Although the embodiment is operable even in a form in which only one of the ACC override threshold value change and LKA override threshold value change is applied, a form in which only one of the accelerator override threshold value and brake override threshold value is applied, or a form in which only one of the additive steering override threshold value and subtractive steering override threshold value is applied, it is preferable to carry out all the threshold value changes concurrently as described above.

Although the embodiment has described in the case in which the accelerator override threshold value is set based on the engine torque request by the driver's accelerator pedal operation, the accelerator override threshold value can also be configured to be set based on the driver's accelerator pedal depression, that is, an accelerator pedal position.

In the same manner, although the embodiment has described the case in which the brake override threshold value is set based on the deceleration request by the driver's brake pedal operation, the brake override threshold value can also be configured to be set based on the driver's brake pedal depression, that is, a brake pedal position.

Although the embodiment has exemplified the case in which the steering override threshold value is set based on the steering torque, the steering override threshold value can also be configured to be set based on the steering angle, steering angle speed, or the like.

Although some embodiments of the present invention have been described above, the present invention is not limited to the embodiments, various modifications and changes are possible within the scope of the present invention.

REFERENCE SIGNS LIST

10 Automated driving controller
11 Environmental condition estimating part
12 Path generating part
13 Vehicle control part
14 ACC controller
15 LKA controller
21 External sensor
22 Internal sensor
31 EPS controller
32 Engine controller
33 ESP/ABS controller
34 Manual steering (steering wheel)
41 Steering mechanism
42 Engine
43 Brake

The invention claimed is:

1. A driving control apparatus for a vehicle, comprising:
an environmental condition estimating part including a surrounding recognition function for recognizing a vehicle's driving lane and other vehicles driving in the driving lane and a function for obtaining the vehicle's moving state;
a path generating part for generating a target path on the basis of information obtained by the environmental condition estimating part; and
a vehicle control part configured to perform speed control for keeping a preset target speed or target inter-vehicle distance with a preceding other vehicle and steering control for causing the vehicle to follow the target path, and having:
an ACC function for performing constant speed cruise according to the target speed when there is no preceding other vehicle in the vehicle's driving lane and performing following cruise by maintaining the predetermined inter-vehicle distance when there is a preceding other vehicle;
an LKA function for maintaining cruise in the vehicle's driving lane by following control to the target path;
an override function for stopping the ACC function and the LKA function by a driver's operation intervention; and
at a time of system limit of the LKA function, a function for notifying the driver of stopping the LKA function and the ACC function and operation takeover and performing fallback control of the LKA function and the ACC function, the fallback control including gradually decreasing the LKA function and the ACC function, wherein at the time of system limit of the LKA function, override threshold values serving as a determination criterion of the driver's operation intervention for stopping the LKA function and the ACC function are set to second values respectively greater than first values during normal operation when the LKA function is within the system limit.

2. The driving control apparatus for the vehicle according to claim 1, wherein the system limit of the LKA function is determined on the basis that curvature of a curve or lateral acceleration exceeds a set limit value.

3. The driving control apparatus for the vehicle according to claim 1, wherein the override threshold values include ACC override threshold values composed of an accelerator override threshold value serving as a determination criterion of accelerator operation intervention and/or a brake override threshold value serving as a determination criterion of brake operation intervention.

4. The driving control apparatus for the vehicle according to claim 1, wherein the override threshold values include LKA override threshold values composed of an additive steering override threshold value and/or a subtractive steering override threshold value serving as a determination criterion of steering operation intervention.

5. The driving control apparatus for the vehicle according to claim 1, wherein the second values of the override threshold values at the time of system limit of the LKA function are respectively maintained from the notification of stopping the ACC function and the LKA function and operation takeover to end of the fallback control, and when the fallback control is finished, the override threshold values are respectively set back to the first values.

6. The driving control apparatus for a vehicle, according to claim 1, wherein the environmental condition estimating part has a function that monitors whether the vehicle state is within the system limit on the basis of an external information obtained through an external sensor and a vehicle information obtained by an internal sensor.

\* \* \* \* \*